United States Patent
Kim et al.

(10) Patent No.: US 9,395,546 B2
(45) Date of Patent: Jul. 19, 2016

(54) STEREOSCOPIC IMAGE PROCESSING SYSTEM AND DEVICE AND GLASSES

(75) Inventors: Dalyoung Kim, Seoul (KR); Jihye Baek, Seoul (KR); Youngjin Noh, Seoul (KR); Yunjoo Kim, Pyeongtaek-si (KR); Doyoung Kim, Pyeongtaek-si (KR); Jaeho Kim, Pyeongtaek-si (KR); Hayoung Seo, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 316 days.

(21) Appl. No.: 13/882,095

(22) PCT Filed: Jun. 20, 2011

(86) PCT No.: PCT/KR2011/004477
§ 371 (c)(1),
(2), (4) Date: Apr. 26, 2013

(87) PCT Pub. No.: WO2012/057434
PCT Pub. Date: May 3, 2012

(65) Prior Publication Data
US 2013/0215504 A1    Aug. 22, 2013

(30) Foreign Application Priority Data

Oct. 29, 2010  (KR) .................. 10-2010-0107175
Nov. 3, 2010   (KR) .................. 10-2010-0108790

(51) Int. Cl.
*G02B 27/22*    (2006.01)
*H04N 13/00*    (2006.01)
*H04N 13/04*    (2006.01)

(52) U.S. Cl.
CPC ............ *G02B 27/22* (2013.01); *G02B 27/2242* (2013.01); *G02B 27/2264* (2013.01); *H04N 13/0022* (2013.01); *H04N 13/0429* (2013.01); *H04N 13/0497* (2013.01)

(58) Field of Classification Search
CPC ........... G02B 27/2228; G02B 27/2221; G02B 27/2242; G02B 27/0172; G02B 2027/014; G02B 27/017; G02B 17/023; G02B 27/022; G02B 6/0016; G02B 6/0023; G02B 7/10; G02B 7/102; G02B 7/12; H04N 13/0431; H04N 2213/008; H04N 13/0429
USPC ......... 359/462, 466, 464, 467, 471, 472, 473, 359/474, 475, 477
See application file for complete search history.

(56) References Cited

U.S. PATENT DOCUMENTS 5,661,603 A * 8/1997 Hanano et al. ............... 359/622
2010/0201694 A1   8/2010 Lee et al.
2011/0051077 A1 * 3/2011 Sugihara .................. G02C 9/00
                                                              351/158

FOREIGN PATENT DOCUMENTS

JP    2008-209476 A    9/2008
KR    10-2009-0014921 A  2/2009
KR    10-2010-0090481 A  8/2010

*Primary Examiner* — Jade R Chwasz
(74) *Attorney, Agent, or Firm* — Birch, Stewart, Kolasch & Birch, LLP

(57) ABSTRACT

A stereoscopic image processing system, a stereoscopic image processing method and glasses are disclosed. The stereoscopic image processing system transmits a control value for controlling a prism diopter of glasses having a prismatic effect on light irradiated for displaying a left-view image and a right-view image, controls the prism diopter of the glasses based on the transmitted control value, and causes the prismatic effect on the light passing through the glasses.

6 Claims, 14 Drawing Sheets

(a)

(b)

STEREOSCOPIC IMAGE PROCESSING SYSTEM AND DEVICE AND GLASSES

TECHNICAL FIELD

The present invention relates to a stereoscopic image processing system, a stereoscopic image processing method and glasses, and more particularly, to a stereoscopic image processing system for displaying a stereoscopic image using a glasses method, a stereoscopic image processing method and glasses.

BACKGROUND ART

At present, digital broadcasting is rapidly supplanting analog broadcasting. Thus, the amount of digital broadcast content has been rapidly increased. As digital broadcast content, content used to display a three-dimensional (3D) image signal as a 3D image have been created, in addition to content used to display a two-dimensional (2D) image signal as a 2D image.

3D image display technology functions based on the principle of binocular disparity: the difference in image location of an object as seen by the left and right eyes of a viewer, and is divided into a glasses method (shutter glasses method), a non-glasses method, and a full-3D method. The glasses method refers to a method for enabling a viewer to wear glasses having a special function in order to view a stereoscopic image. The glasses method is largely divided into a shutter glasses method for alternately opening and closing left and right shutters and a polarization method for mounting different circularly polarizing plates in left-eye and right-eye glass lenses.

DISCLOSURE OF INVENTION

Technical Problem

Accordingly, the present invention is directed to a stereoscopic image processing system, a stereoscopic image processing method, and glasses that substantially obviate one or more problems due to limitations and disadvantages of the related art.

An object of the present invention is to provide a stereoscopic image processing system, a stereoscopic image processing method, and glasses, which are capable of reducing a human factor generated while viewing a stereoscopic image.

Solution to Problem

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a stereoscopic image processing method includes transmitting a control value for controlling a prism diopter of glasses having a prismatic effect on light irradiated for displaying a left-view image and a right-view image, controlling the prism diopter of the glasses based on the transmitted control value, and causing the prismatic effect on the light passing through the glasses. The control value may be one of a depth value of a stereoscopic image displayed by the left-view image and the right-view image, a prism diopter and a voltage value.

The controlling of the prism diopter of the glasses may include calculating the prism diopter using the depth value and a distance between both eyes, and setting the prism diopter of the glasses to the calculated prism diopter.

The setting of the prism diopter of the glasses may include calculating a value of a voltage to be applied to liquid crystal cells of the glasses based on the calculated prism diopter, and applying the voltage to the liquid crystal cells of the glasses according to the calculated voltage value.

The calculating of the prism diopter may include calculating the prism diopter based on a difference between a value obtained by dividing the distance between both eyes by a visual point distance calculated using a viewing distance and the depth value and a value obtained by dividing the distance between both eyes by the viewing distance.

The stereoscopic image processing method may further include calculating the control value using a depth value of a stereoscopic image displayed by the left-view image and the right-view image and a distance between both eyes.

The controlling of the prism diopter of the glasses may include calculating a voltage value based on the transmitted control value, and applying a voltage to liquid crystal cells of the glasses according to the calculated voltage value.

The controlling of the prism diopter of the glasses may include applying a voltage to liquid crystal cells of the glasses according to the transmitted control value.

In another aspect of the present invention, glasses include a receiver configured to receive a control value for controlling a prism diopter of the glasses, a controller configured to control the prism diopter of the glasses based on the transmitted control value, and a liquid crystal panel configured to cause a prismatic effect on light irradiated for displaying a left-view image and a right-view image and incident to the glasses according to the controlled prism diopter. The control value may be one of a depth value of a stereoscopic image displayed by the left-view image and the right-view image, a prism diopter and a voltage value.

The controller may calculate the prism diopter using the depth value and a distance between both eyes and set the prism diopter of the glasses to the calculated prism diopter.

The controller may calculate the prism diopter based on a difference between a value obtained by dividing the distance between both eyes by a visual point distance calculated using a viewing distance and the depth value and a value obtained by dividing the distance between both eyes by the viewing distance.

The controller may calculate a value of a voltage to be applied to liquid crystal cells of the lens unit based on the calculated prism diopter and apply the voltage to the liquid crystal cells according to the calculated voltage value.

In another aspect of the present invention, a stereoscopic image processing system includes a formatter configured to transmit a control value for controlling a prism diopter of glasses having a prismatic effect on light irradiated for displaying a left-view image and a right-view image, and glasses configured to control the prism diopter based on the transmitted control value and to cause the prismatic effect on the light passing through the glasses. The control value may be a depth value of a stereoscopic image displayed by the left-view image and the right-view image.

The glasses may calculate the prism diopter using the depth value and a distance between both eyes and set the prism diopter of the glasses to the calculated prism diopter.

The glasses may control the focal length based on the transmitted depth value and refract the light according to the controlled focal length. The glasses may calculate a focal length value using the depth value and a viewing distance and set the focal length of the glasses to the calculated focal length value. The glasses may calculate a value of a voltage to be applied to liquid crystal cells of the glasses based on the calculated focal length value, apply the voltage to the liquid crystal cells of the glasses according to the calculated voltage value, and set the focal length. The glasses may calculate the focal length value based on a difference between the reciprocal of the viewing distance and the reciprocal of a difference between the viewing distance and the depth value.

The control value may be one of the prism diopter and the voltage value. The stereoscopic image processing system may further include a controller configured to calculate the prism diopter using a depth value of a stereoscopic image displayed by the left-view image and the right-view image and a distance between both eyes.

The controller may calculate the prism diopter based on a difference between a value obtained by dividing the distance between both eyes by a visual point distance calculated using a viewing distance and the depth value and a value obtained by dividing the distance between both eyes by the viewing distance.

The controller may further calculate a value of a voltage to be applied to liquid crystal cells of the glasses based on the calculated prism diopter.

In another aspect of the present invention, a stereoscopic image processing method includes transmitting a control value for controlling a focal length of glasses, controlling the focal length of the glasses based on the transmitted control value, and refracting a light irradiated for displaying a left-view image and a right-view image according to the controlled focal length. The control value may be one of a depth value of a stereoscopic image displayed by the left-view image and the right-view image, a focal length value and a voltage value.

The controlling of the focal length of the glasses may include calculating a focal length value using the depth value and a viewing distance and setting the focal length of the glasses to the calculated focal length value. The setting of the focal length of the glasses may include calculating a value of a voltage to be applied to a lens unit of the glasses based on the calculated focal length value and applying the voltage to the lens unit of the glasses according to the calculated voltage value. The calculating of the focal length value may include calculating the focal length value based on a difference between the reciprocal of the viewing distance and the reciprocal of a difference between the viewing distance and the depth value.

The stereoscopic image processing method may further include calculating the control value using the depth value of the stereoscopic image displayed by the left-view image and the right-view image and a viewing distance.

The controlling of the focal length of the glasses may include calculating a voltage value based on the transmitted control value and applying a voltage to the lens unit of the glasses according to the calculated voltage value.

The controlling of the focal length of the glasses may include applying the voltage to the lens unit of the glasses according to the transmitted control value.

In another aspect of the present invention, glasses include a receiver configured to a control value for controlling a focal length of the glasses, a controller configured to control the focal length of the glasses based on the transmitted control value, and a lens unit configured to refract a light irradiated for displaying a left-view image and a right-view image according to the controlled focal length. The control value may be one of a depth value of a stereoscopic image displayed by the left-view image and the right-view image, a focal length value and a voltage value.

The controller may calculate a focal length value using the depth value and a viewing distance and set the focal length of the glasses to the calculated focal length value.

The controller may calculate the focal length value based on a difference between the reciprocal of the viewing distance and the reciprocal of a difference between the viewing distance and the depth value.

The controller may calculate a value of a voltage to be applied to the liquid crystal cells of the lens unit and apply the voltage to the liquid crystal cells of the lens unit according to the calculated voltage value.

In another aspect of the present invention, a stereoscopic image processing system includes a formatter configured to transmit a control value for controlling a focal length of glasses, and glasses configured to control the focal length based on the transmitted control value and to refract a light irradiated for displaying a left-view image and a right-view image. The control value may be a depth value of a stereoscopic image displayed by the left-view image and the right-view image.

The glasses may calculate a focal length value using the depth value and a viewing distance and set the focal length of the glasses to the calculated focal length value.

The control value may be one of the focal length value and the voltage value.

The stereoscopic image processing system may further include a controller configured to calculate the focal length value using a depth value of a stereoscopic image displayed by the left-view image and the right-view image and a viewing distance.

The controller may calculate the focal length value based on a difference between the reciprocal of the viewing distance and the reciprocal of a difference between the viewing distance and the depth value.

The controller may further calculate a value of a voltage to be applied to the lens unit of the glasses based on the calculated focal length value.

In another aspect of the present invention, a stereoscopic image processing method includes transmitting a first control value for controlling a prism diopter of glasses having a prismatic effect on light irradiated for displaying a left-view image and a right-view image and a second control value for controlling a focal length of the glasses, controlling the prism diopter of the glasses based on the transmitted first control value and controlling the focal length of the glasses based on the transmitted second control value, and refracting the light passing through the glasses according to the controlled focal length and causing the prismatic effect with respect to the refracted light. The first control value may be one of a depth value of a stereoscopic image displayed by the left-view image and the right-view image, a prism diopter and a voltage value. The second control value may be one of a depth value of a stereoscopic image displayed by the left-view image and the right-view image, a focal length value and a voltage value.

In another aspect of the present invention, a stereoscopic image processing method includes receiving a first control value for controlling a prism diopter of glasses having a prismatic effect on light irradiated for displaying a left-view image and a right-view image and a second control value for controlling a focal length of the glasses, controlling the prism diopter of the glasses based on the received first control value and controlling the focal length of the glasses based on the received second control value, and causing the prismatic effect on the light passing through the glasses and refracting the light according to the controlled focal length. The first control value may be one of a depth value of a stereoscopic image displayed by the left-view image and the right-view image, a prism diopter and a voltage value. The second control value may be one of a depth value of a stereoscopic image displayed by the left-view image and the right-view image, a focal length value and a voltage value.

It is to be understood that both the foregoing general description and the following detailed description of the present invention are exemplary and explanatory and are intended to provide further explanation of the invention as claimed.

Advantageous Effects of Invention

According to the present invention, by applying an adequate voltage to liquid crystal cells according to a displayed image so as to change the level of the prismatic effect, it is possible to reduce eye and brain strain due to convergence angle mismatch when viewing a stereoscopic image.

By changing a focal length of glasses according to a displayed image, it is possible to reduce eye and brain strain due to accommodation mismatch when viewing a stereoscopic image.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
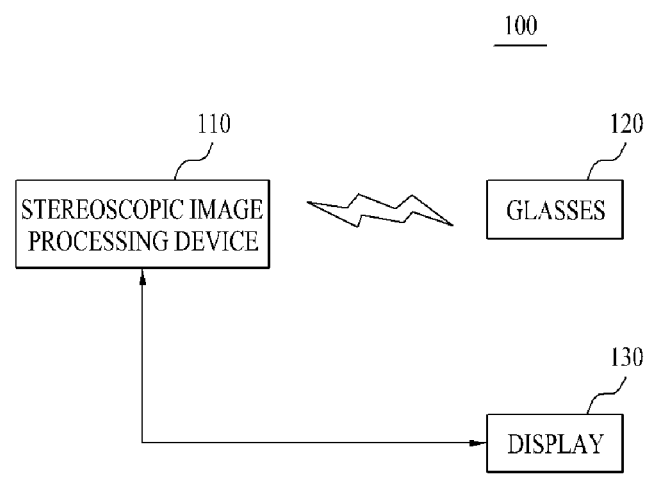
FIG. 1 is a block diagram showing the configuration of a stereoscopic image display system according to an exemplary embodiment of the present invention.

Hereinafter, the preferred embodiments of the present invention will be described with reference to the accompanying drawings. The configuration and action of the present invention shown in the drawings and described with reference to the drawings will be described as at least one embodiment; however, the technical idea and the core configuration and action of the present invention are not limited thereto.

In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

FIG. 1 is a block diagram showing the configuration of a stereoscopic image display system according to an exemplary embodiment of the present invention.

Referring to FIG. 1, the stereoscopic image processing system 100 may include a stereoscopic image processing device 110, glasses 120 and a display 130. The stereoscopic image processing system 100 may be a personal computer system such as a desktop, laptop, tablet or handheld computer. The stereoscopic image processing system 100 may be a mobile terminal such as a mobile phone, a smart phone, a digital broadcast terminal, a Personal Digital Assistant (PDA), a Portable Multimedia Player (PMP) or a navigation device or a fixed electrical appliance such as a digital TV.

The stereoscopic image processing device 110 and the display 130 may be manufactured and sold together or separately.

The stereoscopic image processing device 110 may be a multimedia device for playing back multimedia data stored in a storage medium or a broadcast receiver for receiving a broadcast signal and decoding multimedia data included in the received broadcast signal. The multimedia data may include a 2D image and a stereoscopic image. The stereoscopic image may be a multi-view image. The multi-view image is composed of a plurality of images acquired by photographing the same subject using a plurality of cameras having different distances or angles therebetween. The image acquired by each camera is defined as a view image.

The broadcast receiver may receive a broadcast signal transmitted through terrestrial broadcast, satellite broadcast and cable broadcast and a broadcast signal transmitted over the Internet. The broadcast receiver may provide an Internet service to a viewer. The Internet service refers to a service which may be provided through the Internet, such as a Content on Demand (CoD), a YouTube service, an information service such as weather, news, regional information and search, an entertainment service such as games and karaoke, a communication service such as a TV mail or a TV Short Message Service (SMS). In the present invention, the broadcast receiver may include a network TV, a web TV and a broadband TV.

The broadcast receiver may be a smart TV for receiving an application from a server through a network and installing and executing the application.

The stereoscopic image processing device 110 may calculate a first control value for controlling a prism diopter of glasses having a prismatic effect on light irradiated for displaying a stereoscopic image and transmit the calculated first control value to the glasses 120. The first control value may be one of a depth value of a stereoscopic image, a prism diopter and a voltage value. The voltage value may indicate the level of a voltage to be applied to a liquid crystal cell of the glasses 120. The stereoscopic image processing device 110 may transmit a sync signal for synchronizing the operations of glass shutters when displaying a left-view image and a right-view image to the glasses 120. The light irradiated for displaying a stereoscopic image may be a light beam.

The stereoscopic image processing device 110 may calculate a second control value for controlling a focal length of the glasses 120 and transmit the calculated second control value to the glasses 120. The second control value may be one of a depth value, a focal length value and a voltage value. The voltage value may indicate the level of a voltage to be applied to a lens unit of the glasses 120. The stereoscopic image processing device 110 may transmit a sync signal for synchronizing the operations of glass shutters when displaying a left-view image and a right-view image to the glasses 120.

The glasses 120 receive the first control value transmitted from the stereoscopic image processing device 110 and control the prism diopter of the glasses 120 based on the first control value. The prismatic effect is caused on the light passing through the glasses according to the controlled prism diopter. Thus, the viewer can view an actual screen in a direction, in which a stereoscopic image recognized by the brain is located, such that eye strain caused due to convergence angle mismatch upon viewing the stereoscopic image can be remarkably reduced.

The glasses 120 receive the second control value transmitted from the stereoscopic image processing device 110 and control the focal length of the glasses 120 based on the received second control value. The light passing through the glasses 120 is refracted according to the controlled focal length. Thus, the viewer can view an actual screen at a focal length (accommodation distance) fitted to a point where a stereoscopic image is located such that eye strain caused due to accommodation-convergence mismatch upon viewing the stereoscopic image can be remarkably reduced.

The glasses 120 may be shutter glasses or polarized glasses. The shutter glasses may receive the sync signal transmitted from the stereoscopic image processing device 110 and control the opening and closing of the shutters according to the received sync signal.

The glasses 120 may be liquid crystal glasses having controllable diopter using an electro-optic effect of liquid crystal. The glasses 120 may include a lens unit having controllable focal length.

The display 130 displays a stereoscopic image under the control of the stereoscopic image processing device 110. The display 130 may be a shutter glasses type display or a polarized type display. That is, the display 130 may alternately display a left-view image and a right-view image using shutter glasses. In addition, the display 130 may differently set the cell position of the left-view image and the cell position of the right-view image and display the left-view image and the right-view image such that light is polarized by polarized lenses. The display 130 may be provided as an independent product or may be integrally provided with the stereoscopic image processing device 110.

Figure 2:
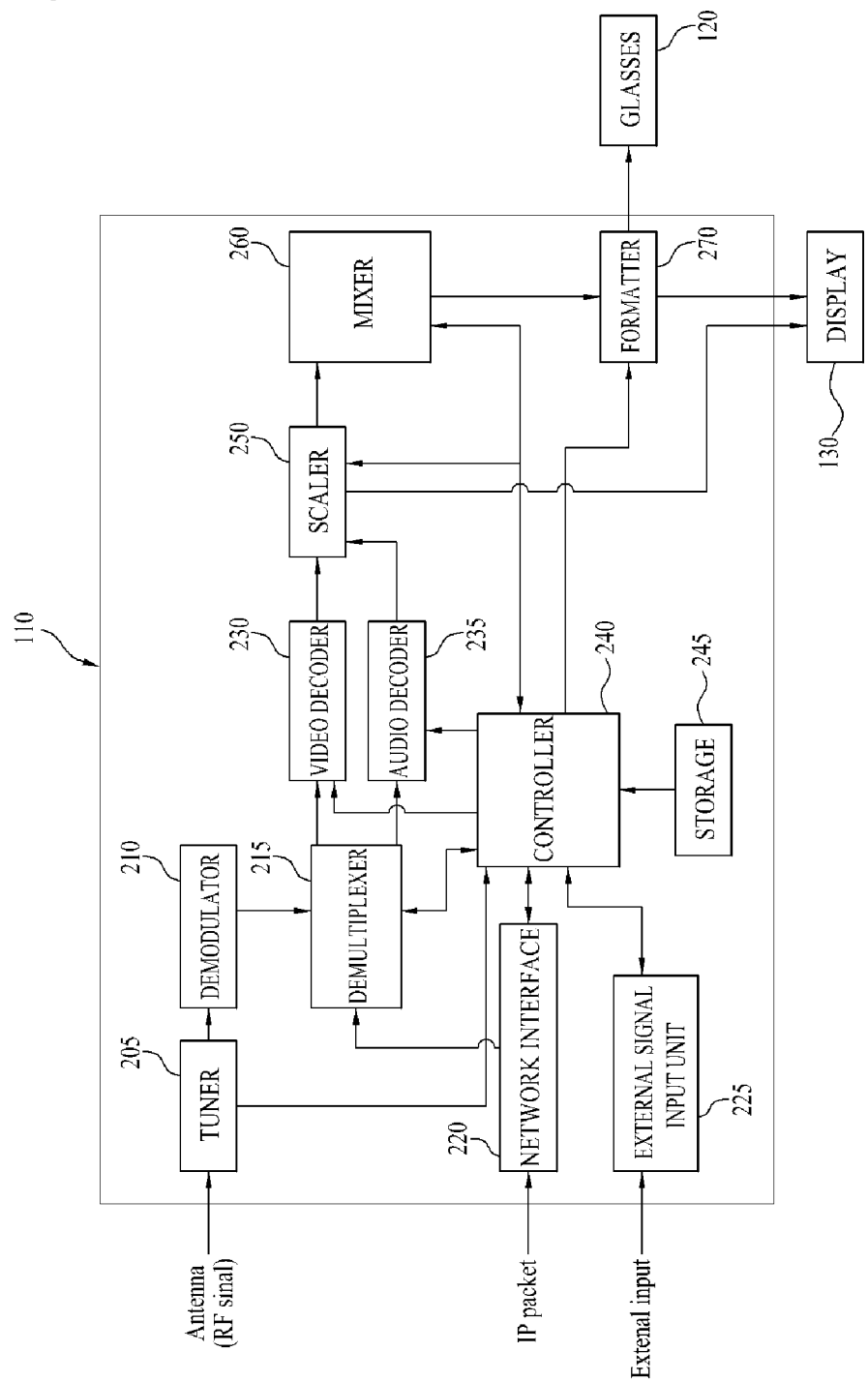
FIG. 2 is a block diagram showing the configuration of a stereoscopic image processing device according to an exemplary embodiment of the present invention.

FIG. 2 is a block diagram showing the configuration of a stereoscopic image processing device according to an exemplary embodiment of the present invention.

Referring to FIG. 2, the stereoscopic image processing device 110 according to the present invention may include a tuner 205, a demodulator 210, a demultiplexer 215, a network interface 220, an external signal input unit 225, a video decoder 230, an audio decoder 235, controller 240, a storage 245, a scaler 250, a mixer 260 and a formatter 270.

The tuner 205 tunes to a Radio Frequency (RF) broadcast signal corresponding to a channel selected by a user from among RF broadcast signals received through an antenna and converts the tuned RF broadcast signal into an Intermediate Frequency (IF) signal or a baseband video or audio signal. The tuner 205 may receive an RF broadcast signal of a single carrier according to an Advanced Television System Committee (ATSC) scheme and an RF broadcast signal of multiple carriers according to a Digital Video Broadcasting (DVB) scheme.

According to another embodiment of the present invention, the stereoscopic image processing device 110 may include at least two tuners. If at least two tuners are included, a second tuner may tune to an RF broadcast signal corresponding to a channel selected by the user from among the RF broadcast signals received through the antenna and converts the tuned RF broadcast signal into an IF signal or a baseband video or audio signal, similar to the first tuner.

The second tuner may sequentially tune to RF broadcast signals of all broadcast channels stored through a channel storage function from among the received RF broadcast signals and convert the tuned RF broadcast signals into IF signals or baseband video or audio signals. The second tuner may periodically perform a conversion operation of all broadcast channels. Accordingly, the stereoscopic image processing device 110 may provide images of several channels converted through the second tuner in the form of thumbnail images while displaying the image of the broadcast signal converted through the first tuner. In this case, the first tuner may convert a main RF broadcast signal selected by the user into the IF signal or the baseband video or audio signal and the second tuner may sequentially/periodically tune to all RF broadcast signals except for the main RF broadcast signal and convert the RF broadcast signals into the IF signals or the baseband video or audio images.

The demodulator 210 receives a digital IF (DIF) signal converted by the tuner 205 and demodulates the DIF signal. For example, if the DIF signal output from the tuner 205 is based on an ATSC scheme, the demodulator 210 performs 8-vestigial side band modulation 8-VSB. As another example, if the DIF signal output from the tuner 205 is based on a DVB scheme, the demodulator 210 performs coded orthogonal frequency division modulation (COFMMA) demodulation.

The demodulator 210 may perform channel decoding. In order to perform channel decoding, the demodulator 210 includes a trellis decoder, a de-interleaver and a Reed-Solomon decoder so as to perform trellis decoding, de-interleaving and Reed-Solomon decoding.

The demodulator 210 may perform demodulation and channel decoding and output a stream signal (TS). At this time, the stream signal may be a signal in which a video signal, an audio signal and a data signal are multiplexed. By way of example, the stream signal will be assumed to be an MPEG-2 Transport Stream (TS) in which an MPEG-2 video signal and a Dolby AC-3 audio signal are multiplexed. In detail, the MPEG-2 TS may include a 4-byte header and a 184-byte payload.

The demultiplexer 215 may receive the stream signal from the demodulator 210, the network interface 220 and the external signal input unit 225. The demultiplexer 215 may demultiplex the received stream signal into a video signal, an audio signal and a data signal and respectively output the video signal, the audio signal and the data signal to the video decoder 230, the audio decoder 235 and the controller 240.

The video decoder 230 receives the video signal from the demultiplexer 215, restores the received video signal, and outputs the restored video signal to the scaler 250. The video signal may include a stereoscopic image signal.

The audio decoder 235 receives the audio signal from the demultiplexer 215, restores the received audio signal, and outputs the restored audio signal to the display 130 or the scaler 250.

The network interface 220 receives packets received from a network and transmits packets to the network. That is, the network interface 220 receives IP packets for delivering broadcast data from a service provision server through the network. The broadcast data includes content, an update message indicating whether or not content is updated, metadata, service information data, and software code. The service information may include service information of a real-time broadcast service and service information of an Internet service.

The network interface 220 may extract stream signals from IP packets and output the stream signals to the demultiplexer 215, if the IP packets include stream signals.

The external signal input unit 225 may provide an interface for connecting an external device to the stereoscopic image processing device 110. The external device refers to various video or audio output devices such as a Digital Versatile Disc (DVD), Blu-ray, game console, camcorders, or (laptop) computers. The stereoscopic image processing device 110 may display the video or audio signal received from the external signal input unit 225 or store or use a data signal.

The controller 240 executes a command and performs an operation associated with the stereoscopic image processing device 110. For example, using the command retrieved from the storage 245, the controller 240 may control data input/output, reception and processing between components of the stereoscopic image processing device 110. The controller 240 may be implemented on a single chip, multiple chips or multiple electric parts. For example, various architectures including dedicated or embedded processors, single-purpose processors, controllers or ASICs may be used in the controller 240. The controller 240 may include at least one processor.

The controller 240 performs an operation for executing computer code along with an operating system and causing and utilizing data. The operating system is generally known and thus will not be described in detail. For example, the operating system may include Windows series OS, Unix, Linux, PalmOS, DOS, Android, and Macintosh. The operating system, other computer code, and data may be present in the storage 245 which operates in association with the controller 240.

The storage 245 generally stores program codes and data used by the stereoscopic image processing device 110. For example, the storage 245 may include a Read Only Memory (ROM), a Random Access Memory (RAM), and a hard disk drive. The program code and the data may be present in a detachable storage medium and, if necessary, may be loaded or installed into the stereoscopic image processing device 110. The detachable storage medium includes a CD-ROM, a PC-CARD, a storage card, a floppy disk, a magnetic tape and a network component.

The scaler 250 adjusts (scales) the signal processed by the video decoder 230 and the audio decoder 235 to the level of a signal output through the display 130 or a speaker (not shown). In detail, the scaler 250 receives the stereoscopic image and scales the stereoscopic image according to resolution or an aspect ratio of the display 130. The display 130 may be manufactured to output frames with predetermined resolution, for example, 720?480 or 1024?768 format. Thus, the scaler 250 may transform the input stereoscopic images into a form suited to the resolution of the display.

In addition, the scaler 250 adjusts the aspect ratio of the stereoscopic image according to the type of displayed content or user setting. The aspect ratio may be 16:9, 4:3 or 3:2. The scaler 250 may adjust a ratio of a screen width to a screen height to a predetermined value.

The scaler 250 may include a primary scaler (not shown) and a secondary scaler (not shown). The primary scaler (not shown) may scale a primary screen or any one of a left-view image or a right-view image of a stereoscopic image signal. The secondary scaler (not shown) may scale a secondary screen or any one of a left-view image or a right-view image of a stereoscopic image signal.

In addition, the scaler 250 may apply image quality setting values (e.g., color, sharpness) applied for displaying a stereoscopic image to left and right images of a stereoscopic image signal, respectively. The image setting values may be controlled or set by the controller 240. The scaler 250 may apply the predetermined image quality setting values to left and right images of a stereoscopic image signal to be displayed under the control of the controller 240. The operation for applying the predetermined image quality setting values to the left and right images of the stereoscopic image signal to be displayed may be performed by the formatter 270, instead of the scaler 250.

The mixer 260 mixes the outputs of the scaler 250 and the controller 240 and outputs the mixed output.

The formatter 270 converts the video and audio signals output from the mixer 260 into the output format of the display 130. The formatter 270 bypasses the received signal without performing conversion if a 2D image is displayed. If a stereoscopic image is displayed, the formatter may operate as a 3D formatter for processing the signals and outputting a 3D format according to a stereoscopic image format and an output frequency of the display 130, under the control of the controller 240.

The formatter 270 may output the signal converted for implementing a stereoscopic image to the display 130, generates a sync signal of the output stereoscopic image signal, and transmit the sync signal to the glasses 120. The formatter 270 may include an infrared output unit (not shown), for transmission of the sync signal. The sync signal may be a signal for synchronizing a display time of the left-view image or right-view image and an opening/closing time of a left-eye lens or a right-eye lens of the shutter glasses 120.

The infrared output unit (not shown) transmits the sync signal generated by the formatter 270 to the glasses 120.

The formatter 270 may transmit the first control value for controlling the prism diopter of the glasses 120. The first control value may be a depth value of a stereoscopic image displayed by the left-view image and the right-view image, a prism diopter or a voltage value.

The formatter 270 may transmit the second control value for controlling the focal length of the glasses 120. The second control value may be a depth value of a stereoscopic image displayed by the left-view image and the right-view image, a focal length value or a voltage value.

Figure 3:
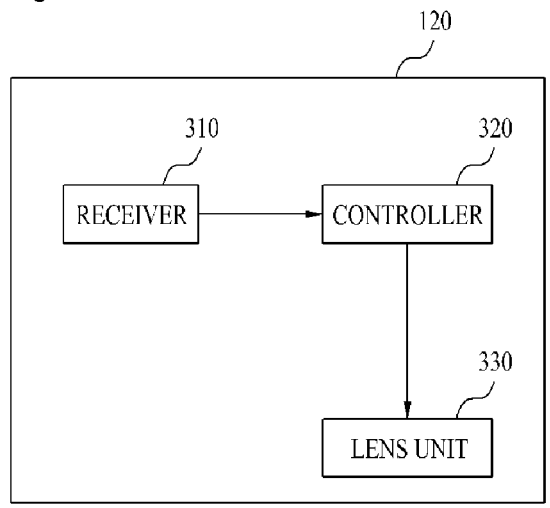
FIG. 3 is a block diagram showing the configuration of glasses according to an exemplary embodiment of the present invention.

FIG. 3 is a block diagram showing the configuration of glasses according to an exemplary embodiment of the present invention.

Referring to FIG. 3, the glasses 120 include a receiver 310, a controller 320 and a lens unit 330.

The receiver 310 may receive the first control value for controlling the prism diopter of the glasses 120 and the sync signal. The first control value may be a depth value of a stereoscopic image displayed by the left-view image and the right-view image, a prism diopter or a voltage value. The sync signal may be a signal for synchronizing a display time of the left-view image or right-view image and an opening/closing time of a left-eye lens or a right-eye lens of the shutter glasses 120.

The receiver 310 may receive the second control value for controlling the focal length of the glasses 120 and the sync signal. The first control value may be a depth value of a stereoscopic image displayed by the left-view image and the right-view image, a focal length value or a voltage value. The sync signal may be a signal for synchronizing a display time of the left-view image or right-view image and an opening/closing time of a left-eye lens or a right-eye lens of the shutter glasses 120.

The controller 320 may control shutter opening periods of a left-eye shutter liquid crystal panel (left-eye lens) and a right-eye shutter liquid crystal panel (right-eye lens) according to the received sync signal. In detail, when the display 130 displays the left-view image, the left-eye shutter liquid crystal panel transmits a light beam and the right-eye shutter liquid crystal panel does not transmit a light beam. Thus, the left-view image is delivered only to the left eye of the user who wears the glasses. When the display 130 displays the right-view image, the left-eye shutter liquid crystal panel does not transmit a light beam and the right-eye shutter liquid crystal panel transmits a light beam. Thus, the right-view image is delivered only to the right eye of the user.

The controller 320 may calculate the prism diopter using the depth value received by the receiver 310 and a distance between both eyes. The prism diopter may be calculated based on a difference between a value obtained by dividing the distance between both eyes by a visual point distance calculated using a viewing distance and the depth value and a value obtained by dividing the distance between both eyes by a viewing distance.

The controller 320 may calculate a value of a voltage to be applied to liquid crystal cells of the glasses based on the calculated prism diopter. The controller 320 may apply a voltage to the lens unit of the glasses according to the calculated voltage value.

The controller 320 may calculate a focal length value using the depth value received by the receiver 310 and the viewing distance. The focal length value may be calculated based on a difference between the reciprocal of the viewing distance and the reciprocal of a difference between the viewing distance and the depth value.

The controller 320 may calculate a value of a voltage to be applied to the lens unit of the glasses based on the calculated focal length value. The controller 320 may apply the voltage to the lens unit of the glasses according to the calculated voltage value.

The lens unit 330 may include a plurality of liquid crystal cells. The lens unit 330 may have a diopter which varies according to the level of the voltage applied to the liquid crystal cells or a prismatic effect.

The lens unit 330 may refract the light beam irradiated for displaying the left-view image and the right-view image. The lens unit 330 may have a diopter or focal length which varies according to the level of the voltage applied to the liquid crystal cells.

In one embodiment, the lens unit 330 may include a plurality of lenses each having a controllable focal length. The plurality of lenses may include zoom lenses.

Figure 4:
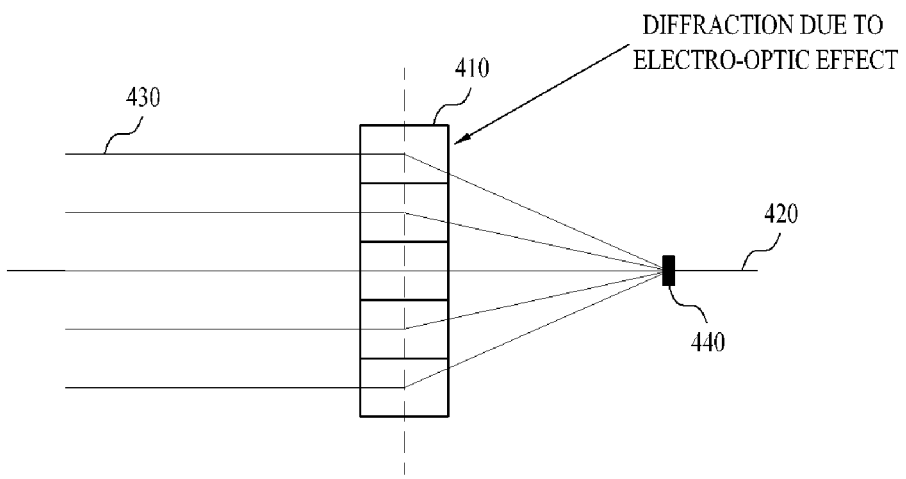
FIG. 4 is a diagram showing a process of changing a path of a light beam incident to a liquid crystal panel according to an embodiment of the present invention.

FIG. 4 is a diagram showing a process of changing a path of a light beam incident to a liquid crystal panel according to an embodiment of the present invention.

Referring to FIG. 4, the lens unit 330 may be a liquid crystal panel 410 including a plurality of liquid crystal cells. If different voltages are applied to the liquid crystal cells included in the liquid crystal panel 410, the liquid crystal cells may differently refract light beams by an electro-optic effect. By adequately controlling voltages applied to the liquid crystal cells, light beams 430 passing through the liquid crystal cells may be controlled to be concentrated to one focal point 440. Since the phenomenon in which light beams are concentrated occurs similar to a lens, the liquid crystal panel effectively functions as a lens. Thus, in the present invention, it is possible to adequately control the voltages applied to the liquid crystal cells so as to vary the diopter of the glasses.

Figure 5:
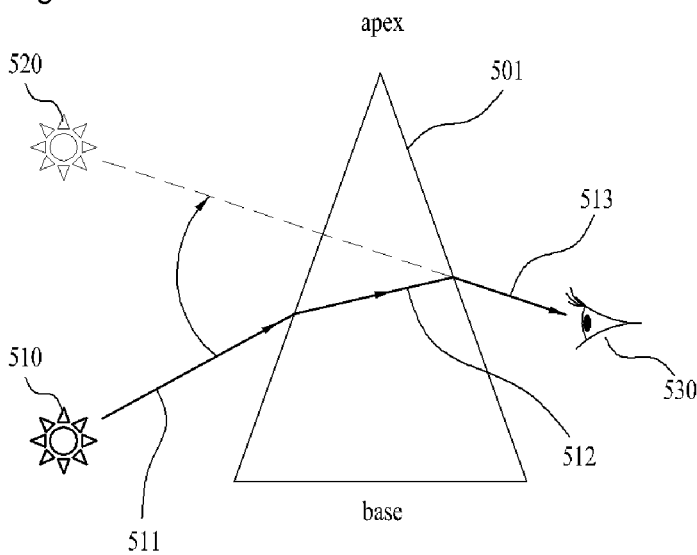
FIG. 5 is a diagram showing a path of a light beam passing through a prism.

FIG. 5 is a diagram showing a path of a light beam passing through a prism.

Referring to FIG. 5, a light beam 511 entering a prism 501 is refracted to a base (a thick part) to pass the prism 501 along a path 512 and the light beam 512 is refracted again to enter an eye 530 through a path 513. When an object located on a point 510 is viewed through the prism 501 in a state in which an eye is located at a point 530, the direction of a sight line varies to an apex (the peak) of the prism. A variation in sight line through the prism is referred to as a prismatic effect. That is, the eye 530 can view the object located on the point 510 that appears to be located on the point 520, by the prismatic effect.

Figure 6:
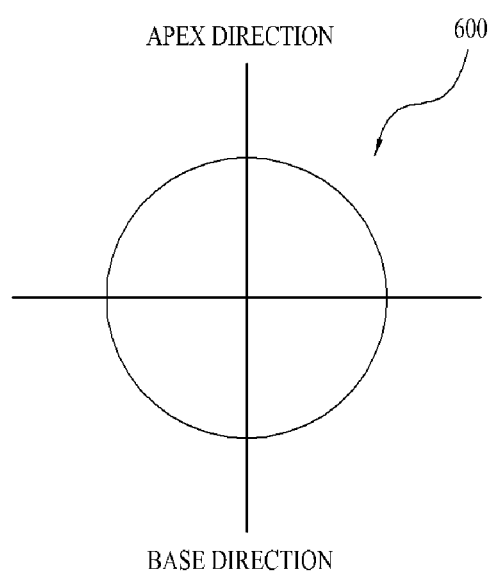
FIG. 6 is a diagram showing a state in which a prismatic effect is not caused.
Figure 7:
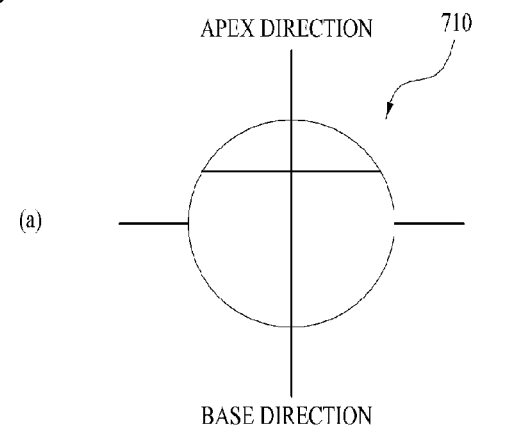
FIGS. 7A to 7C are diagrams showing states in which a prismatic effect is caused.
Figure 7:
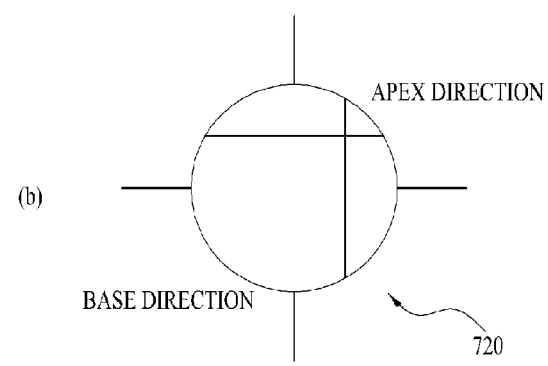
Figure 7:
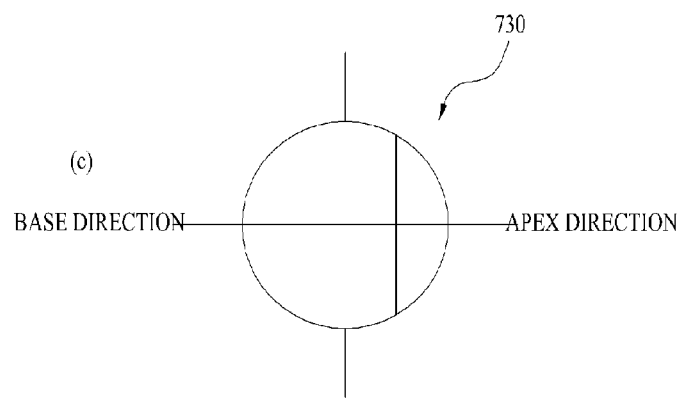

FIG. 6 is a diagram showing a state in which a prismatic effect is not caused, and FIGS. 7A to 7C are diagrams illustrating states in which a prismatic effect is caused in the state of FIG. 6.

Referring to FIGS. 6 and 7A to 7C, when the prismatic effect is caused, an image 600 is viewed. An image viewed through the prism, that is, an image viewed through a light beam in which the prismatic effect is caused, is shifted to the apex side of the prism, as in an image 710, an image 720 and an image 730.

Figure 8:
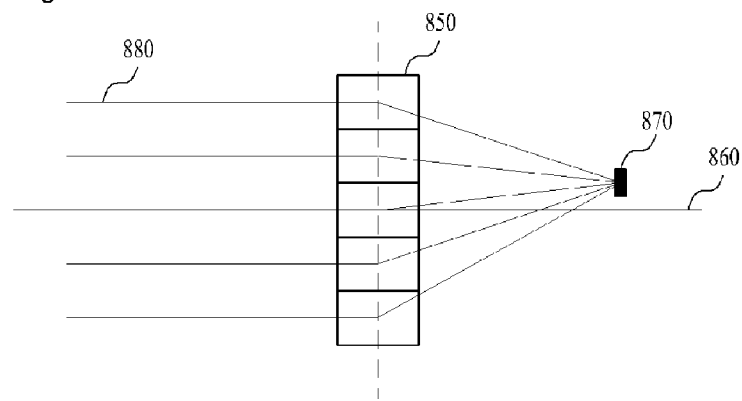
FIG. 8 is a diagram showing a process of changing a path of a light beam incident to a liquid crystal panel according to another embodiment of the present invention.

FIG. 8 is a diagram showing a process of changing a path of a light beam incident to a liquid crystal panel according to another embodiment of the present invention.

Referring to FIG. 8, the controller 320 may apply a voltage to liquid crystal cells of the lens unit 330 such that the lens unit 330 operates in the same manner as the liquid crystal panel 850. The light beams 880 passing through the liquid crystal panel 850 are concentrated to a focal point 870 deviated from an optical axis 860. If a focal point of a lens or a liquid crystal panel having a diopter is deviated from an optical axis of a lens and a sight line of an eye by a predetermined angle, the lens or the liquid crystal panel has a prismatic effect.

The focal point of the lens unit 330 may be located on the focal axis 420 like the focal point 440 of the liquid crystal panel 410 or may be shifted from the optical axis 860 like the focal point 870 of the liquid crystal panel 850, according to the voltage applied to the liquid crystal cells. That is, when a 2D image is displayed, a voltage is applied to the lens unit such that the lens unit 330 may perform a general lens function in the same manner as the liquid crystal panel 850. When a stereoscopic image is displayed, a voltage is applied to the lens unit such that the lens unit 330 performs a lens function having a prismatic effect in the same manner as the liquid crystal panel 850. Thus, the liquid crystal glasses according to the present invention enable the user to continuously view an image in a state of wearing the glasses, even when witching between 2D and 3D content.

Figure 9:
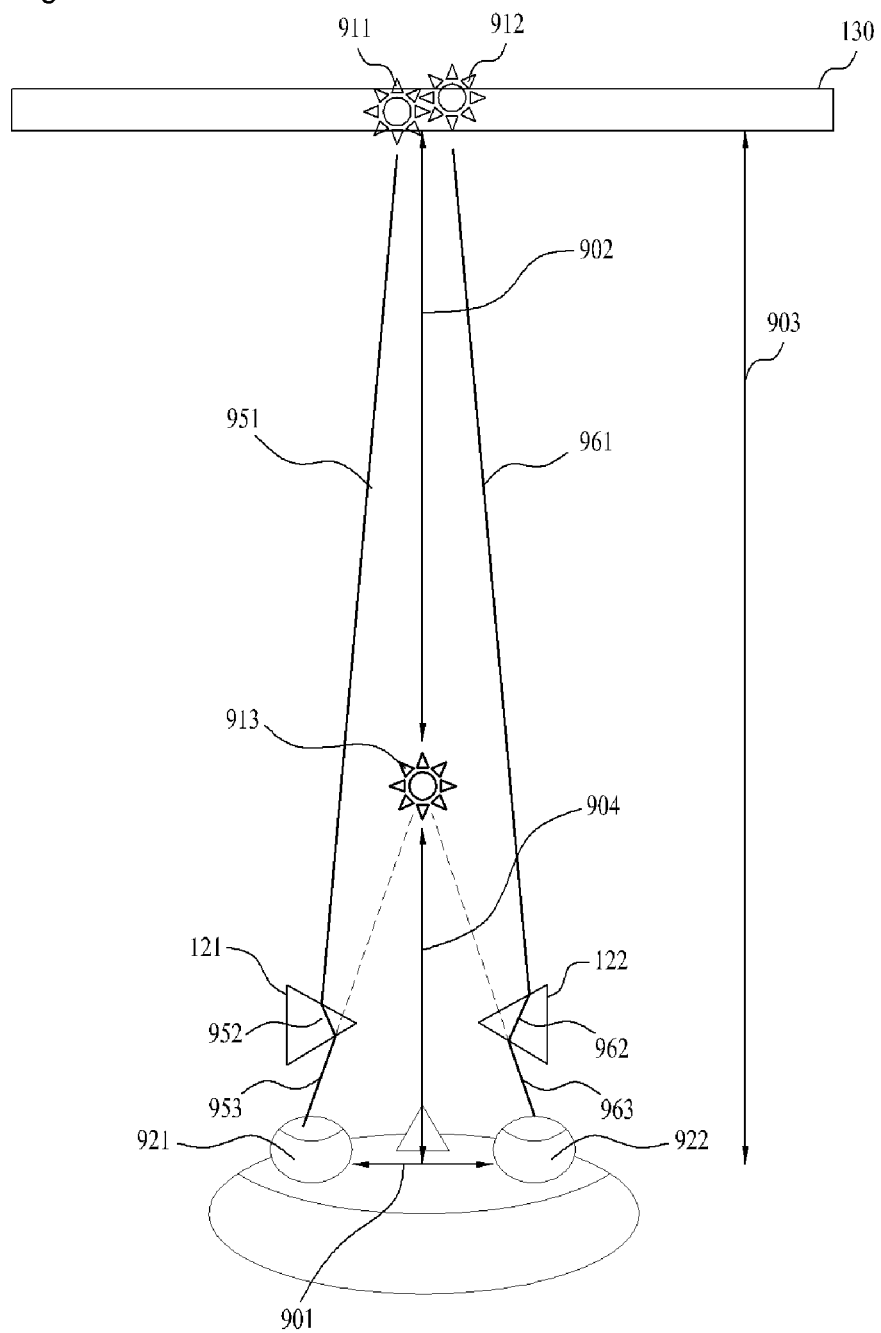
FIG. 9 is a diagram illustrating an operation of a stereoscopic image processing system according to the present invention.

FIG. 9 is a diagram illustrating an operation of a stereoscopic image processing system according to the present invention.

Referring to FIG. 9, the display 130 emits a light beam 911 in order to display a left-view image and emits a light beam 912 in order to display a right-view image. The light beam 911 emitted for displaying the left-view image enters the left-eye liquid crystal panel 121 along a path 951. The incident light beam 951 passes through the left-eye liquid crystal panel 121 along a path 952 and a light beam 952 passing through the left-eye liquid crystal panel 121 enters a left eye 921 along a path 953. That is, the left-eye liquid crystal panel 121 causes a prismatic effect on the light beam 911 passing therethrough. Thus, the viewer can view a left-view image on the sight line directed to a point in which a stereoscopic image recognized by the brain is located.

The light beam 912 emitted for displaying the right-view image enters a right-eye liquid crystal panel 122 along a path 961. The incident light beam 961 passes through a right-eye liquid crystal panel 122 along a path 962 and a light beam 962 passing through the right-eye liquid crystal panel 122 enters a right eye 922 along a path 963. That is, the right-eye liquid crystal panel 122 causes a prismatic effect on the light beam passing through the glasses. Thus, the viewer can view a right-view image on the sight line directed to a point in which a stereoscopic image recognized by the brain is located.

The level of the prismatic effect may be calculated using Equation 1.

Prism diopter ($\Delta$)=(distance between pupils)/(distance from eye to visual point)  Equation 1

The controller 320 may calculate a prism diopter for minimizing eye strain using Equation 2.

Prism diopter ($\delta\Delta$)=distance 901/distance 904−distance 901/distance 903  Equation 2 where, the distance 901 denotes a distance between both eyes, the distance 904 denotes a distance from an eye to a stereoscopic image 913, and the distance 903 denotes a distance from an eye to the display 130. The distance 904 may be a difference between the distance 903 and a distance 902. The distance 902 denotes a depth value of a stereoscopic image and the distance 903 may be a viewing distance. Hereinafter, the distance 904 is referred to as a visual point distance. The distance 903 may be measured by the stereoscopic image processing device 110 or the glasses 120. The stereoscopic image processing device 110 and the glasses 120 may transmit the measured distance 903 to each other or the stereoscopic image processing device 110 may transmit the measured distance 903 along with the depth value of the stereoscopic image. The distance 903 may be measured by a depth camera, may be calculated through an image photographed by a viewer or may be measured using a light beam or wave.

Figure 10:
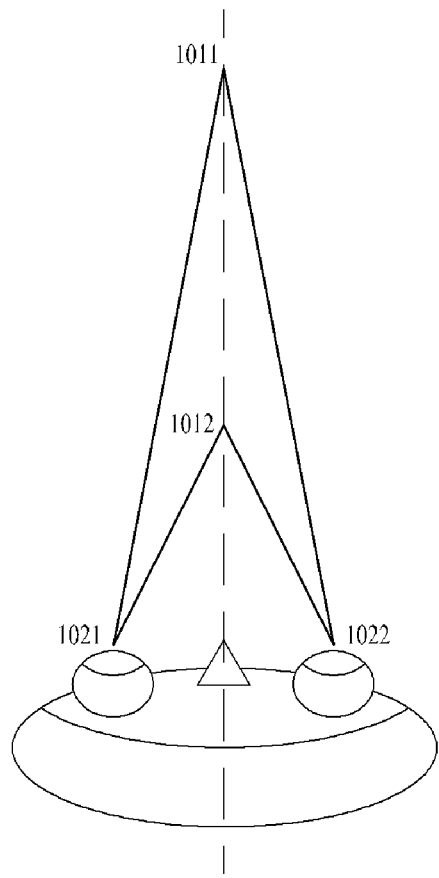
FIG. 10 is a diagram illustrating accommodation, convergence and divergence when viewing a distant object and a near object.

FIG. 10 is a diagram illustrating accommodation, convergence and divergence when viewing a distant object and a near object.

Referring to FIG. 10, accommodation refers to a phenomenon in which the thickness of a crystalline lens is controlled to change a focal length such that a clear image is formed on a retina, convergence refers to a phenomenon in which both eyes are located on a central portion when viewing a near place, and divergence refers to a phenomenon in which both eyes spread to both sides when viewing a distant place.

As an example of accommodation, when a pair of two eyes 1021 and 1022 view a distant object 1011, a focal length (or an accommodation distance) of the eye 1021 is fitted to a distance from the point 1021 to the point 1011 and a focal length (or an accommodation distance) of the eye 1022 is fitted to a distance from the point 1022 to the point 1011 such that the crystalline lenses of the eyes 1021 and 1022 become thin. As another example of accommodation, when a pair of two eyes 1021 and 1022 view a near object 1012, a focal length (or an accommodation distance) of the eye 1021 is fitted to a distance from the point 1021 to the point 1012 and a focal length (or an accommodation distance) of the eye 1022 is fitted to a distance from the point 1022 to the point 1012 such that the crystalline lenses of the eyes 1021 and 1022 become thick.

As an example of divergence, when the eyes 1021 and 1022 view the distant object 1011, divergence in which both eyes spread occurs so as to obtain a convergence angle between the eyes 1021 and 1022 and the visual point 1011. As an example of convergence, when the eyes 1021 and 1022 view the near object 1012, convergence in which both eyes are located on the central portion occurs so as to obtain a convergence angle between the eyes 1021 and 1022 and the visual point 1012.

When a stereoscopic image is viewed, the display panel is located on the point 1011, but the position of the stereoscopic image viewed by the viewer through the display panel is the point 1012. Thus, since the position 1012 of the stereoscopic image recognized by the brain and the position 1011 of an actual image recognized by the eye do not match each other, a eye strain occurs due to accommodation and divergence.

In the present invention, due to the prismatic effect, the view images 911 and 912 can be viewed in the sight line direction of the stereoscopic image recognized by the brain. Accordingly, in the present invention, it is possible to minimize eye strain caused due to mismatch between the convergence angle when viewing the view images 911 and 912 and the convergence angle when viewing the stereoscopic image recognized by the brain.

In the present invention, accommodation mismatch is solved using the focal length of the glasses such that the view images can be viewed at the focal length of the stereoscopic image recognized by the brain. Accordingly, in the present invention, it is possible to minimize eye strain caused due to mismatch between the accommodation when viewing the view images and the accommodation when viewing the stereoscopic image recognized by the brain.

Figure 11:
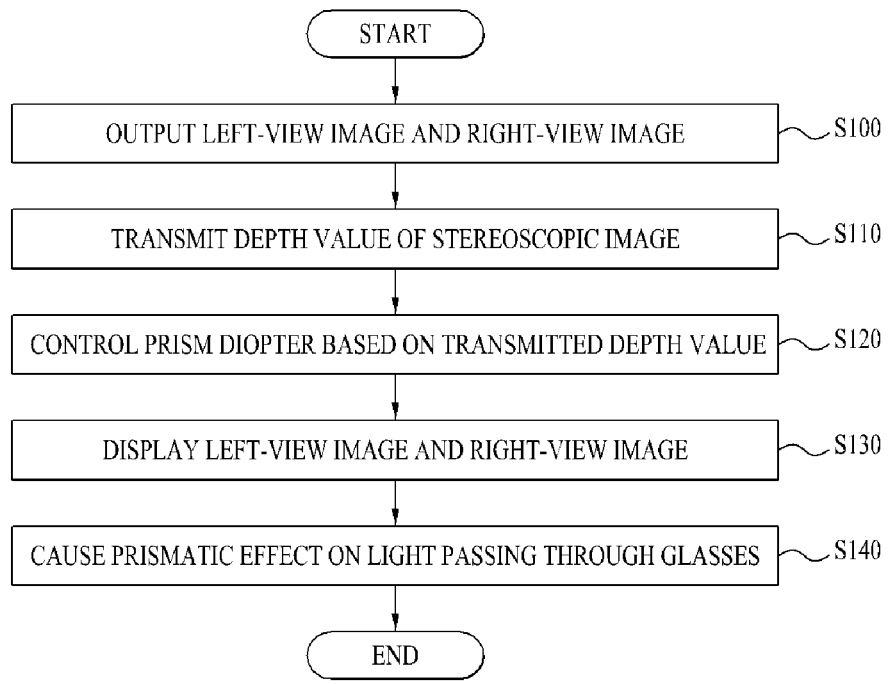
FIG. 11 is a diagram showing a stereoscopic image processing method according to an exemplary embodiment of the present invention.

FIG. 11 is a diagram showing a stereoscopic image processing method according to an exemplary embodiment of the present invention.

Referring to FIG. 11, the formatter 270 outputs the left-view image and the right-view image (S100).

The formatter 270 transmits a depth value for controlling the prism diopter of the glasses having the prismatic effect on the light beam irradiated for displaying the output left-view image and right-view image (S110). The formatter 270 may calculate the depth value and may receive the depth value from the controller 240. The formatter 270 may transmit a sync signal for synchronizing the operation of the shutter glasses when the left-view image and the right-view image are displayed, along with the depth value.

The glasses control the prism diopter based on the depth value transmitted by the formatter 270 (S120). The prism diopter may be calculated based on the difference between the value obtained by dividing the distance between both eyes by the visual point distance calculated using the viewing distance and the depth value and the value obtained by dividing the distance between both eyes by the viewing distance. The glasses may calculate the prism diopter using Equation 2. The glasses may set the prism diopter to the calculated prism diopter.

The display 130 displays the output left-view image and right-view image (S130). The display 130 may display the left-view image and the right-view image using the shutter glasses method or the polarization method.

The prismatic effect is caused on the light beam passing through the glasses (S140). The light beam emitted for displaying the left-view image and the right-view image in step S130 enters the liquid crystal panel of the glasses and the prismatic effect is caused with respect to the incident light beam according to the prism diopter of the glasses. Thus, the viewer can view an actual screen in a direction in which a stereoscopic image recognized by the brain is located. Accordingly, in the present invention, it is possible to remarkably reduce eye strain caused due to convergence angle mismatch when viewing a stereoscopic image.

Figure 12:
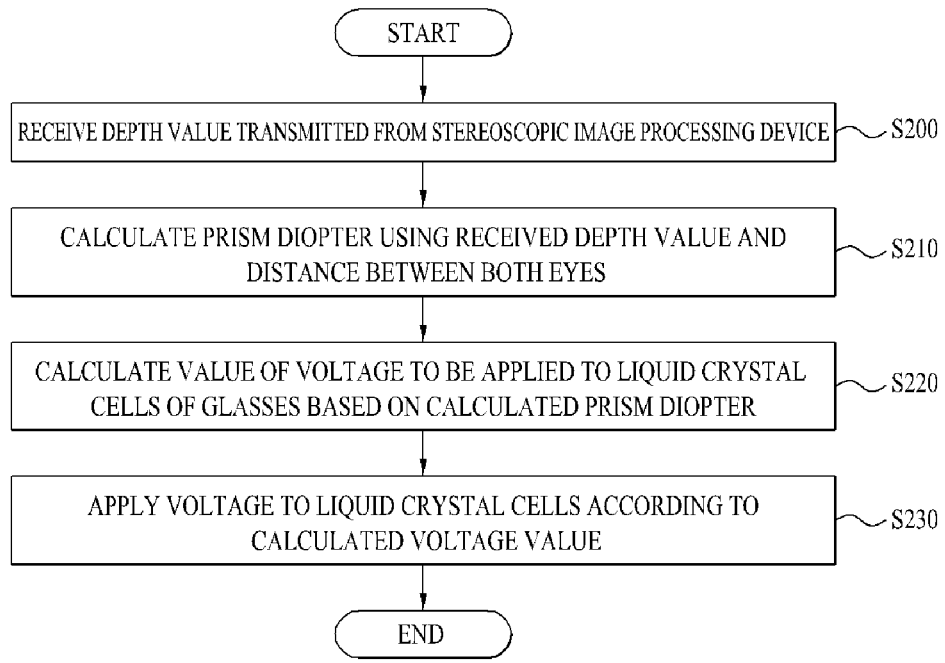
FIG. 12 is a diagram showing a method of driving glasses according to an exemplary embodiment of the present invention.

FIG. 12 is a diagram showing a method of driving glasses according to an exemplary embodiment of the present invention.

Referring to FIG. 12, the receiver 310 receives the depth value transmitted from the stereoscopic image processing device (S200). The receiver 310 may receive the depth value transmitted in step S110.

The controller 320 calculates a prism diopter using the received depth value and the distance between both eyes (S210). The prism diopter may be calculated based on the difference between the value obtained by dividing the distance between both eyes by the visual point distance calculated using the viewing distance and the depth value and the value obtained by dividing the distance between both eyes by the viewing distance. The controller 320 may calculate the prism diopter using Equation 2.

The controller 320 calculates the value of the voltage to be applied to the liquid crystal cells of the glasses based on the calculated prism diopter (S220).

The controller 320 applies the voltage to the liquid crystal cells of the glasses according to the calculated voltage value (S230).

Step S120 may include steps S210, S220 and S230.

Figure 13:
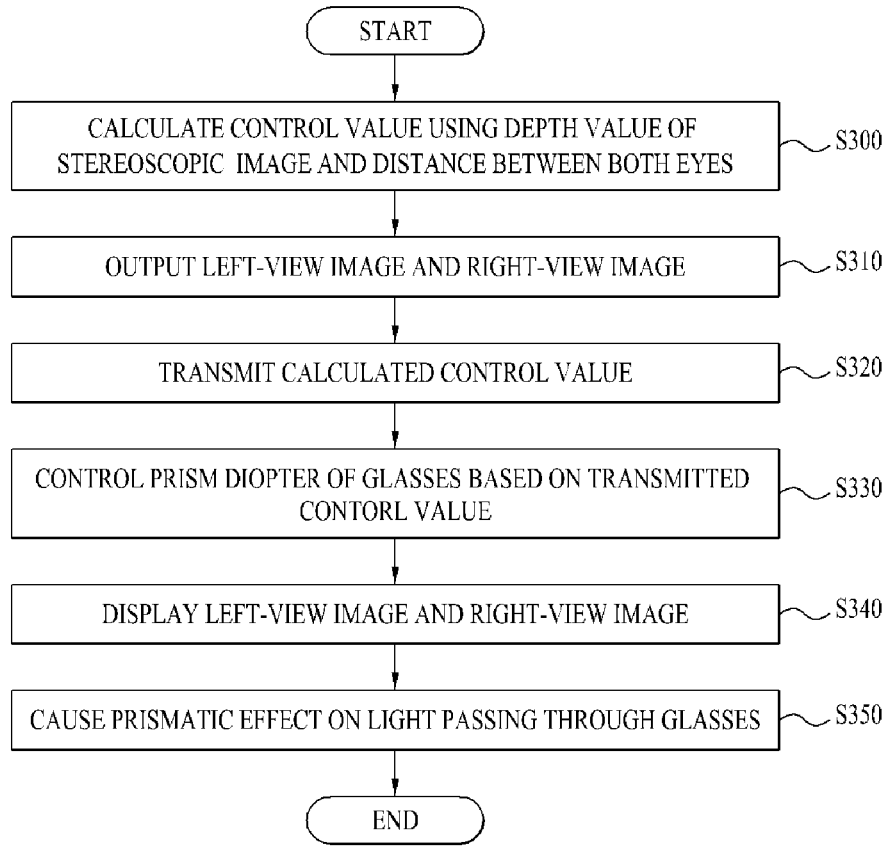
FIG. 13 is a diagram showing a stereoscopic image processing method according to another exemplary embodiment of the present invention.

FIG. 13 is a diagram showing a stereoscopic image processing method according to another exemplary embodiment of the present invention.

Referring to FIG. 13, the controller 240 calculates a first control value using a depth value of a stereoscopic image displayed by a left-view image and a right-view image and a distance between the eyes (S300). The first control value may be one of a prism diopter and a voltage value. The prism diopter may be calculated based on the difference between the value obtained by dividing the distance between both eyes by the visual point distance calculated using the viewing distance and the depth value and the value obtained by dividing the distance between the eyes by the viewing distance. The controller 240 may calculate the prism diopter using Equation 2. The controller 240 may calculate the value of the voltage to be applied to the liquid crystal cells of the glasses based on the calculated diopter.

The formatter 270 outputs the left-view image and the right-view image (S310).

The formatter 270 transmits the first control value calculated by the controller 240 (S320). The formatter 270 may transmit a sync signal for synchronizing the operation of the shutter glasses when the left-view image and the right-view image are displayed, along with the depth value.

In another embodiment, instead of the controller 240, the formatter 270 may calculate the first control value.

The glasses control the prism diopter based on the first control value (S330). If the transmitted first control value is a prism diopter, the glasses calculate a voltage value based on the transmitted first control value and apply the voltage to the liquid crystal cells according to the calculated voltage value. If the transmitted first control value is a voltage value, the glasses may apply the voltage to the liquid crystal cells of the glasses according to the transmitted voltage value.

The display 130 displays the output left-view image and right-view image (S340). The display 130 may display the left-view image and the right-view image using the shutter glasses method or the polarization method.

The glasses cause the prismatic effect on the light beam passing therethrough (S350). The light beams emitted for displaying the left-view image and the right-view image in step S340 enter the liquid crystal panel of the glasses and the prismatic effect is caused on the incident light beam according to the prism diopter of the glasses.

Figure 14:
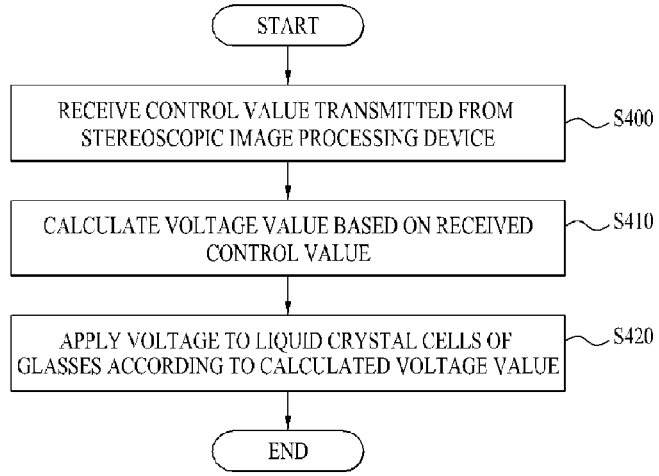
FIG. 14 is a diagram showing a method of driving glasses according to another exemplary embodiment of the present invention.

FIG. 14 is a diagram showing a method of driving glasses according to another exemplary embodiment of the present invention.

Referring to FIG. 14, the receiver 310 receives a first control value transmitted from the stereoscopic image processing device (S400). The receiver 310 may receive the first control value transmitted in step S320.

The controller 320 calculates a voltage value based on the first control value received by the receiver 310 (S410).

The controller 320 applies the voltage to the liquid crystal cells of the glasses according to the calculated voltage value (S420).

Step S330 may include steps S410 and S420.

Figure 15:
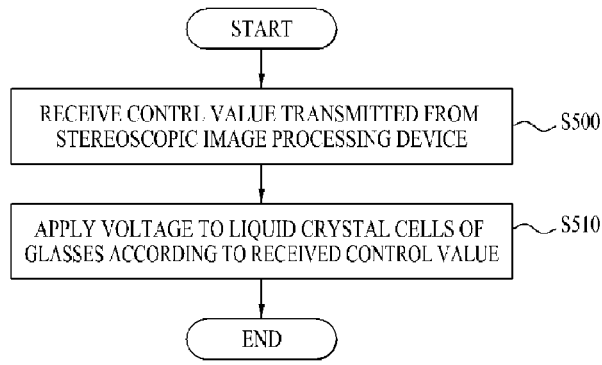
FIG. 15 is a diagram showing a method of driving glasses according to another exemplary embodiment of the present invention.

FIG. 15 is a diagram showing a method of driving glasses according to another exemplary embodiment of the present invention.

Referring to FIG. 15, the receiver 310 receives a first control value transmitted from the stereoscopic image processing device (S500). The receiver 310 may receive the first control value transmitted in step S320.

The controller 320 applies the voltage to the liquid crystal cells of the glasses according to the first control value received by the receiver 310 (S510).

Step S330 may include step S510.

Figure 16:
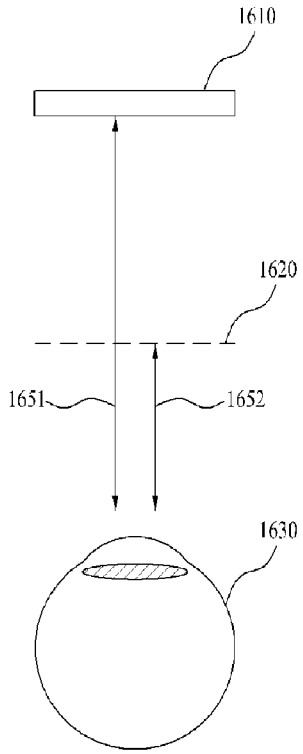
FIG. 16 is a diagram illustrating focal length control according to a depth value of a stereoscopic image.

FIG. 16 is a diagram illustrating focal length control according to a depth value of a stereoscopic image.

Referring to FIG. 16, the stereoscopic image processing system 10 may control the focal length of the lens unit 330 so as to solve accommodation mismatch according to the depth value of the stereoscopic image. If the display is located on a position 1610, an eye is located on a position 1630, and a stereoscopic image recognized by the brain according to the depth value of the stereoscopic image is located on a position 1620, a viewing distance from the eye 1630 to the display 1610 becomes a distance 1651 and a distance from the eye 11630 to the stereoscopic image 1620 becomes a distance 1652. Accordingly, the position of the stereoscopic image 1620 recognized by the brain and the position of the actual image 1610 recognized by the eye do not match each other and thus accommodation mismatch occurs. Such accommodation mismatch may be calculated using Equation 3.

$$\text{accomodation mismatch} = \frac{1}{f_1} - \frac{1}{f_2} \quad \text{Equation 3}$$

where, $f_1$ denotes a viewing distance 1651 and $f_2$ denotes a distance 1652 from the eye to the stereoscopic image. The viewing distance 1651 may be measured by the stereoscopic image processing device 110 or the glasses 120. The stereoscopic image processing device 110 and the glasses 120 may transmit the measured distance 1651 to each other and the stereoscopic image processing device 110 may transmit the measured distance 1651 along with the depth value of the stereoscopic image. The distance 1652 may be measured by a depth camera, may be calculated through an image photographed by a viewer or may be measured using light or electric waves.

The distance 1652 may be calculated based on the viewing distance 1651 and the depth value of the stereoscopic image. For example, the distance 1652 may be calculated using Equation 4.

Distance 452=the viewing distance−the depth value of the stereoscopic image    Equation 4

The stereoscopic image processing system 100 may control the focal length of the lens unit 330 according to the accommodation mismatch so as to minimize viewer eye strain of due to accommodation mismatch. The focal length value for controlling the focal length of the lens unit 330 may be calculated using Equation 5.

$$\frac{1}{f_3} = \frac{1}{f_1} - \frac{1}{f_2} \quad \text{Equation 5}$$

where, $f_3$ denotes a focal length value.

The stereoscopic image processing system 100 may calculate the focal length value $f_3$ based on the reciprocal of the accommodation mismatch defined by Equation 3 or calculate the focal length value $f_3$ based on the distance 1651 and the distance 1652 using Equation 5. The stereoscopic image processing system 100 may control the focal length value $f_3$ for controlling the focal distance of the lens unit 330.

Figure 17:
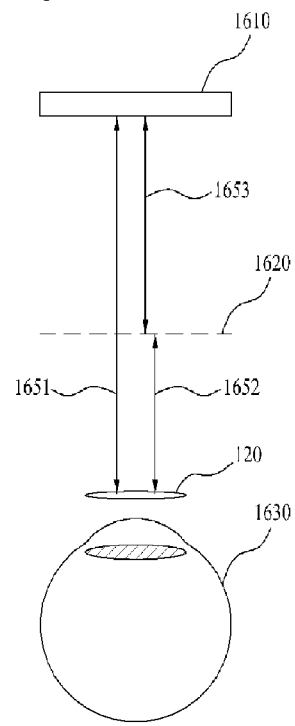
FIG. 17 is a diagram illustrating focal length control when a stereoscopic image protrudes from a display.

FIG. 17 is a diagram illustrating focal length control when a stereoscopic image protrudes from a display.

Referring to FIG. 17, when a stereoscopic image 1620 protrudes from a display 1610, a distance 1652 is less than a distance 1651 by a distance 1653, $1/f_3$ calculated using Equation 5 becomes negative, and $f_3$ becomes negative. Accordingly, if the focal length of the lens unit 330 is controlled to $f_3$, the lens unit 330 functions as a concave lens.

An image of the display 1610 is clearly viewed by a concave lens 120 at a position 1620 separated from the display by the distance 1653. In order to clearly view the display 1610, the crystalline lens of an eye 1630 automatically performs accommodation such that a focal length and the position 1620 coincide. As a result, a viewer can clearly view an image displayed on the display 1610 at an accommodation distance fitted to the position 1620, and the accommodation of the eye for the stereoscopic image 1620 and the accommodation of the eye for the image displayed on the display 1610 may match each other. Accordingly, the stereoscopic image processing system 100 according to the present invention can enable a viewer to clearly view a display image at an accommodation distance fitted to the position 1620 and achieve accommodation-convergence match while forming a stereoscopic image so as to prevent viewer eye strain.

Figure 18:
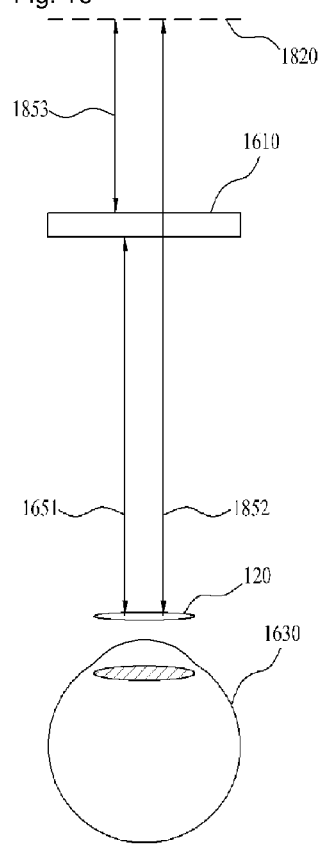
FIG. 18 is a diagram illustrating focal length control when a stereoscopic image retreats from a display.

FIG. 18 is a diagram illustrating focal length control when a stereoscopic image retreats from a display.

Referring to FIG. 18, when a stereoscopic image 1820 retreats from a display 1610, a distance 1852 from an eye 1630 to a stereoscopic image 1820 is greater than a distance 1651 by a distance 1853, $1/f_3$ calculated using Equation 5 becomes positive, and $f_3$ becomes positive. Accordingly, if the focal length of the lens unit 330 is controlled to $f_3$, the lens unit 330 functions as a convex lens.

An image of the display 1610 is clearly viewed by a convex lens 120 at a position 1820 separated from the display by the distance 1653. In order to clearly view the display 1610, the crystalline lens of an eye 1630 automatically performs accommodation such that a focal length is fitted to the position 1820. As a result, a viewer can clearly view an image displayed on the display 1610 at an accommodation distance fitted to the position 1820, and the accommodation of the eye for the stereoscopic image 1820 and the accommodation of the eye for the image displayed on the display 1610 may match each other. Accordingly, even when the stereoscopic image retreats from the display, the stereoscopic image processing system 100 according to the present invention can enable a viewer to clearly view a display image at an accommodation distance fitted to the position 1820 and achieve accommodation-convergence matching while forming a stereoscopic image so as to prevent viewer eye strain.

FIGS. 19A and 19B are diagrams showing a process of changing a path of a light beam incident to a liquid crystal panel according to another embodiment of the present invention.

As shown in FIG. 18, if the position of the stereoscopic image 1820 is changed in a state in which the stereoscopic image 1820 retreats from the display 1610, the controller 320 may control the voltage applied to the liquid crystal cells of the liquid crystal panel 410 such that the focal point 440 is changed according to the changed position of the stereoscopic image 1820. Thus, the stereoscopic image processing system 100 changes the focal length of the liquid crystal panel 410 while the liquid crystal panel 410 functions as a convex lens.

For example, if the stereoscopic image is moved from the position 1820 to the display 1610, the controller 320 may control the voltage applied to the liquid crystal cells of the liquid crystal panel 410 such that the focal point is changed from the position 440 to the position 1950. If the stereoscopic image is further moved from the position 1820 backward, the controller 320 may control the voltage applied to the liquid crystal cells of the liquid crystal panel 410 such that the focal point is changed from the position 440 to the position 1960.

Figure 20:
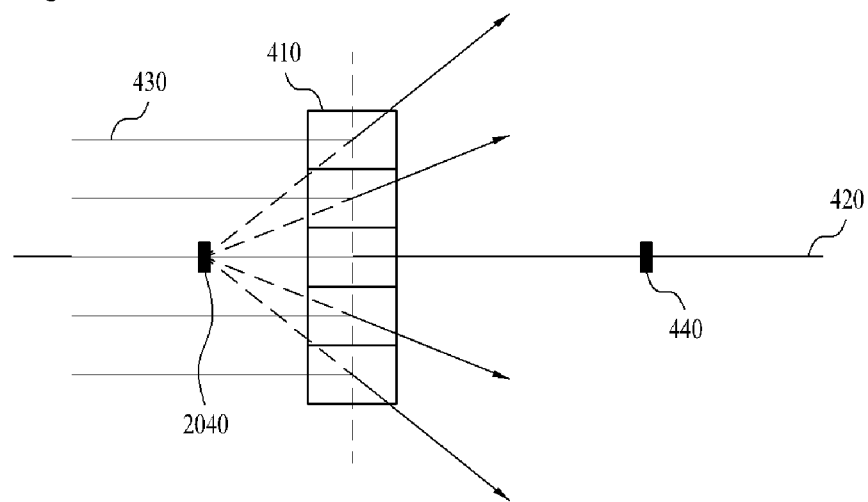
FIG. 20 is a diagram showing a process of changing a path of a light beam incident to a liquid crystal panel according to another embodiment of the present invention.

FIG. 20 is a diagram showing a process of changing a path of a light beam incident to a liquid crystal panel according to another embodiment of the present invention.

Referring to FIG. 20, as shown in FIG. 17, if the stereoscopic image 1620 protrudes from the display 1610, the controller 320 may control the voltage applied to the liquid crystal cells of the liquid crystal panel 410 such that the focal point 440 is changed according to the position of the stereoscopic image 1620.

For example, if the position of the stereo is changed from the position 1820 to the position 1620, the controller 320 may control the voltage applied to the liquid crystal cells of the liquid crystal panel 410 such that the focal point is changed from the position 440 to the position 2040. Thus, the liquid crystal panel 410 functions as a concave lens.

Figure 19:
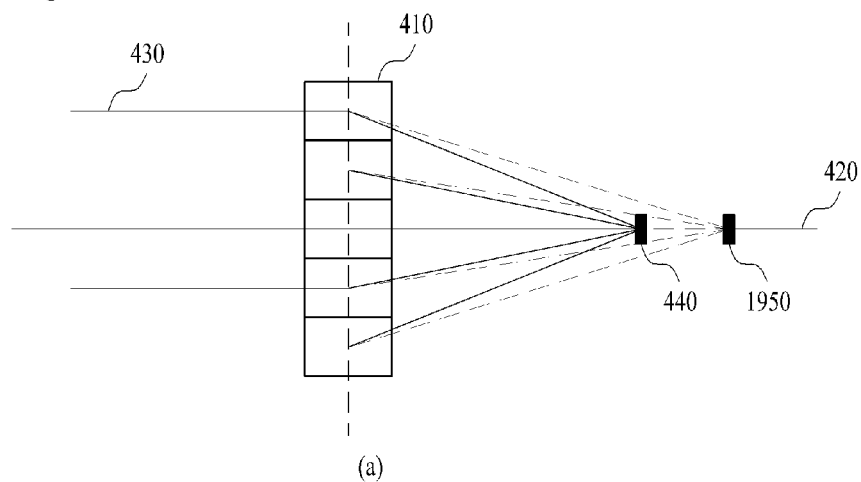
FIGS. 19A and 19B are diagrams showing a process of changing a path of a light beam incident to a liquid crystal panel according to another embodiment of the present invention.
Figure 19:
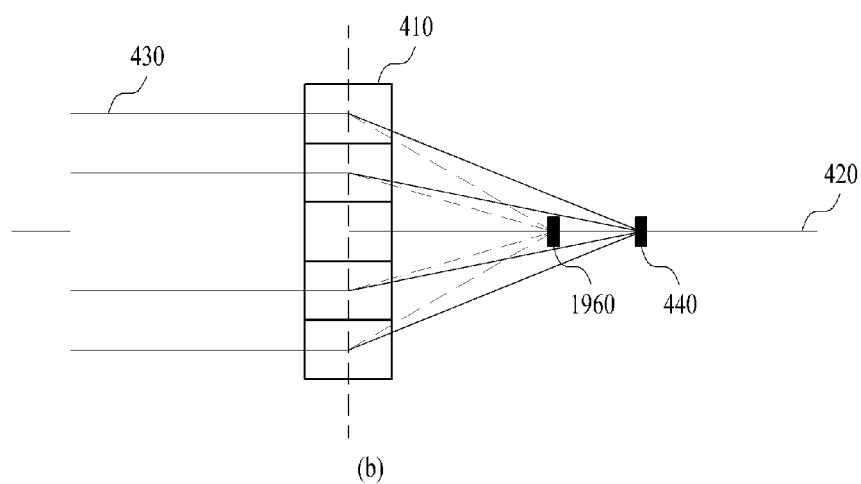

When a 2D image is displayed, the controller 320 applies the voltage such that the liquid crystal panel 410 does not have a diopter. Thus, the viewer can view the 2D image in a state of wearing the glasses 120. When a stereoscopic image is displayed, the controller 320 applies the voltage such that the processes of FIGS. 19A to 20 are performed. Thus, the liquid crystal panel 410 may function as a lens. Accordingly, in the liquid crystal glasses of the present invention, even when switching between the 2D image and the 3D image, it is possible to enable the user to continuously view the image while wearing the glasses.

Figure 21:
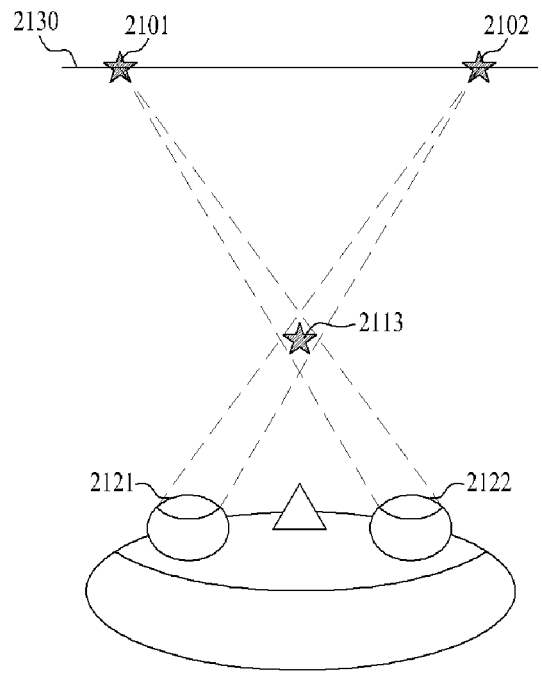
FIG. 21 is a diagram illustrating 2-view display technology.

FIG. 21 is a diagram illustrating 2-view display technology.

Referring to FIG. 21, 2-view display technology refers to technology of making images 2101 and 2102 with different disparity incident to both eyes 2121 and 2122 so as to artificially cause binocular disparity, thereby enabling a viewer to experience a stereoscopic effect.

If the present invention is applied to the 2-view display technology, the focal length of the glasses 120 is controlled such that the right-view image 2101 displayed on the display 2130 is clearly viewed at an accommodation distance of a stereoscopic image 2113 and the left-view image 2102 displayed on the display 2130 is clearly viewed at the accommodation distance of the stereoscopic image 2113.

In the 2-view display technology, convergence mismatch may occur if the focal point is fitted to the position 2101 and the position 2102, and convergence mismatch does not occur but the focal point is mismatched such that the stereoscopic image 2113 becomes blurred if the focal point is fitted to the position 2113. It is noted that convergence and divergence are not related to the focal length of the eye optical system, but only the accommodation (focal length variation) of the crystalline lens is related to convergence/divergence of both eyes and is related to accommodation-convergence mismatch.

Accordingly, if the focal length (or the accommodation distance) of the crystalline lens is first fitted to the stereoscopic image 2113 and then the distance from the position 2101 to the position 2113 and the distance from the position 2102 to the position 2113 are added to the focal length of the glasses on the right eye and the left eye, the accommodation of the crystalline lens and the convergence of both eyes coincide on the point 2113 and the focal point of the eye optical system considering the focal length of the glasses is located on the position 2101 and the position 2102, the viewer can clearly view a stereoscopic image.

Figure 22:
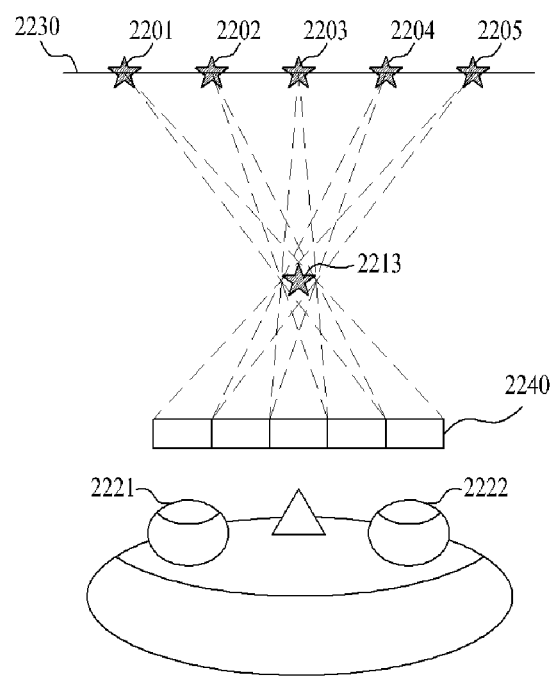
FIG. 22 is a diagram illustrating multi-view display technology.

FIG. 22 is a diagram illustrating multi-view display technology.

Referring to FIG. 22, multi-view display technology refers to stereoscopic image technology in which a display 2230 displays several images 2201, 2202, 2203, 2204 and 2205 with disparity, the displayed images 2201, 2202, 2203, 2204 and 2205 enter a filter 2240 at several fixed viewpoints, and images corresponding to specific fixed viewpoints passing through the filter 2240 enter both eyes 2221 and 2222, thereby forming a stereoscopic image 2213. In the multi-view display technology, a plurality of viewpoints is displayed so as to simultaneously cause binocular disparity and motion parallax, thereby enabling a viewer to experience a stereoscopic effect.

If the principle of the present invention applied to the 2-view display technology is applied to two view images which actually enter the viewer's eyes among the several viewpoints of the multi-view display technology, in the present invention, it is possible to provide a viewer with a further improved stereoscopic image with binocular disparity and motion parallax without causing eye strain, by the merit of the multi-view display technology capable of providing motion parallax.

Figure 23:
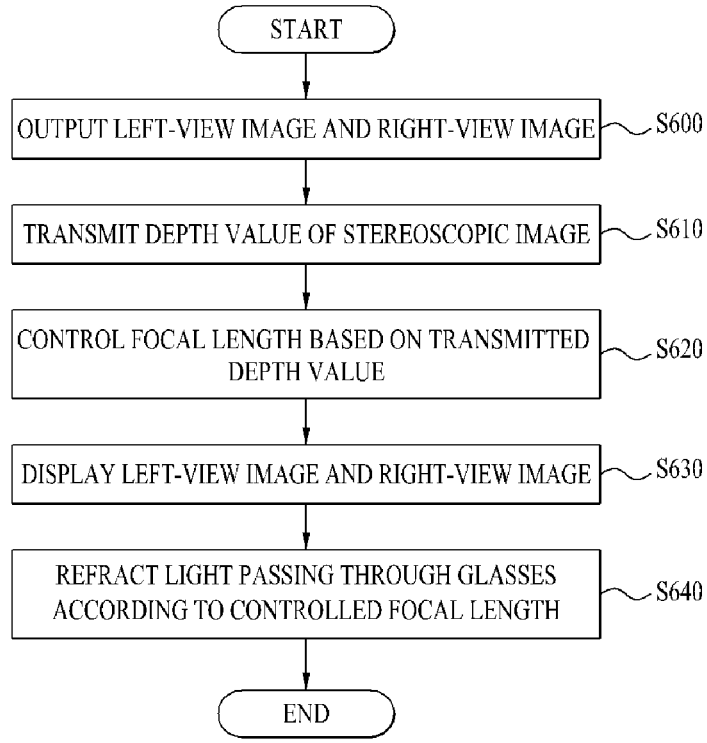
FIG. 23 is a diagram showing a stereoscopic image processing method according to another exemplary embodiment of the present invention.

FIG. 23 is a diagram showing a stereoscopic image processing method according to another exemplary embodiment of the present invention.

Referring to FIG. 23, the formatter 270 outputs the left-view image and the right-view image (S600).

The formatter 270 transmits the depth value of the stereoscopic image displayed by the output left-view image and right-view image (S610). The formatter 270 may calculate the depth value and may receive the depth value from the controller 240. The formatter 270 may transmit a sync signal for synchronizing the operation of the shutter glasses when the left-view image and the right-view image are displayed, along with the depth value.

The glasses control the prism diopter based on the depth value transmitted by the formatter 270 (S620). The glasses 120 may calculate the focal length value based on the depth value and control the focal length based on the calculated focal length value. The focal length value may be calculated based on the difference between the reciprocal of the viewing distance and the reciprocal of the difference between the viewing distance and the depth value. The glasses 120 may calculate the focal length value using Equation 5.

The display 130 displays the output left-view image and right-view image (S630). The display 130 may display the left-view image and the right-view image using the shutter glasses method or the polarization method. In addition, the display 130 may display the view image according to the 2-view display technology shown in FIG. 21 or the multi-view display technology shown in FIG. 22.

Light is refracted as it passes through the lenses of the glasses 120 according to the controlled focal length (S640). The light beam emitted for displaying the left-view image and the right-view image in step S630 enter the lens unit of the glasses and the incident light beam is refracted according to the focal length of the glasses. Thus, the viewer can clearly view an actual screen at a focal length (or accommodation distance) fitted to the position of the stereoscopic image recognized by the brain. Accordingly, in the present invention, it is possible to remarkably reduce eye strain caused due to accommodation mismatch when viewing a stereoscopic image.

Figure 24:
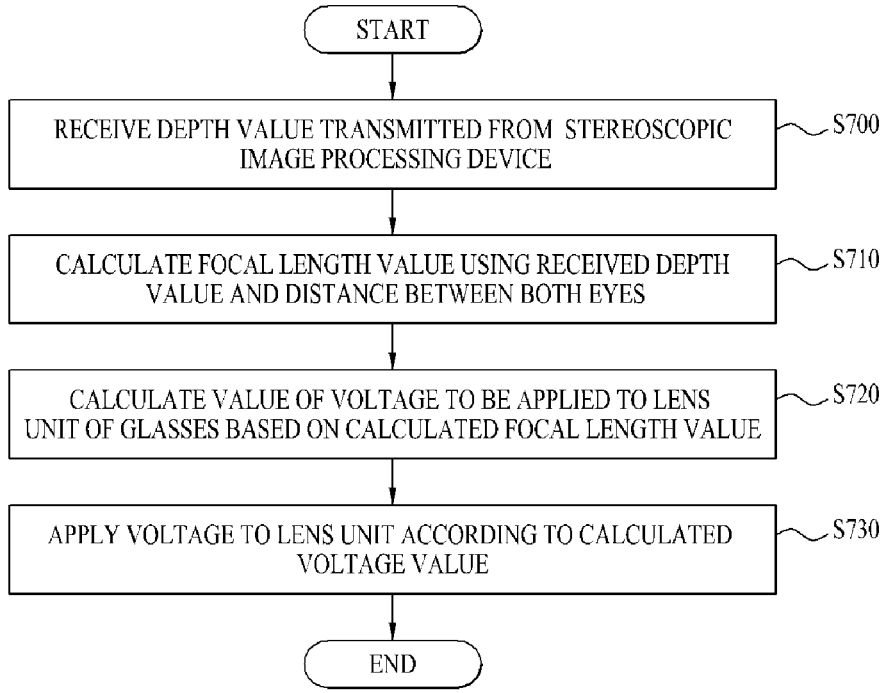
FIG. 24 is a diagram showing a method of driving glasses according to another exemplary embodiment of the present invention.

FIG. 24 is a diagram showing a method of driving glasses according to another exemplary embodiment of the present invention.

Referring to FIG. 24, the receiver 310 receives the depth value transmitted from the stereoscopic image processing device 110 (S700). The receiver 310 may receive the depth value transmitted in step S610.

The controller 320 calculates a focal length value using the received depth value received by the receiver 310 and the viewing distance (S710). The focal length value may be calculated based on the difference between the reciprocal of the viewing distance and the reciprocal of the difference between the viewing distance and the depth value. The controller 320 may calculate the focal length value using Equation 5.

The controller 320 calculates a value of a voltage to be applied to the lens unit 330 based on the calculated focal length value (S720).

The controller 320 applies the voltage to the lens unit 330 according to the calculated voltage value (S730).

Step S620 may include steps S710, S720 and S730.

Figure 25:
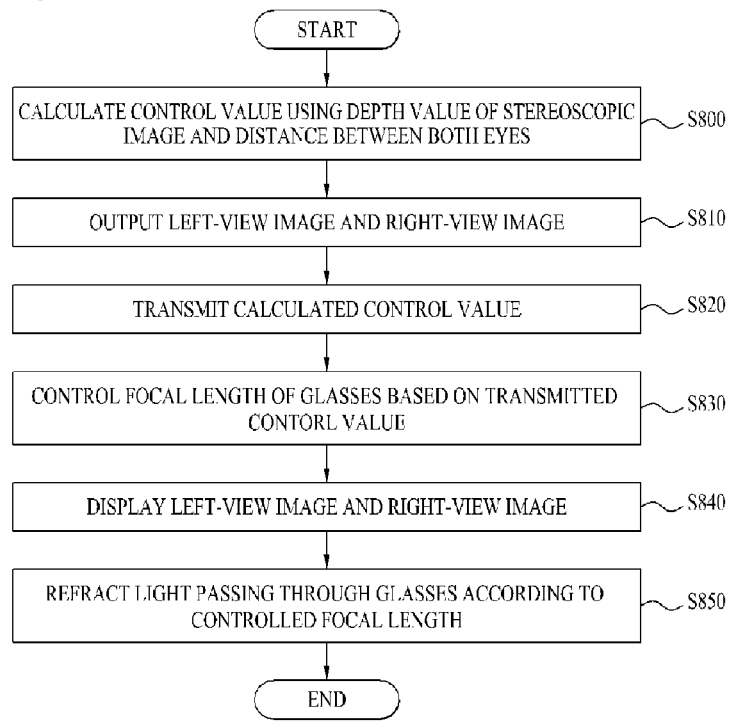
FIG. 25 is a diagram showing a stereoscopic image processing method according to another exemplary embodiment of the present invention.

FIG. 25 is a diagram showing a stereoscopic image processing method according to another exemplary embodiment of the present invention.

Referring to FIG. 25, the controller 240 calculates a second control value using a depth value of a stereoscopic image displayed by a left-view image and a right-view image and a viewing distance (S800). The second control value may be one of a focal length value and a voltage value. The focal length value may be calculated based on the difference between the reciprocal of the viewing distance and the reciprocal of the difference between the viewing distance and the depth value. The controller 240 may calculate the focal length value using Equation 5. The controller 240 may calculate a value of a voltage to be applied to the lens unit of the glasses based on the calculated focal length value.

The formatter 270 outputs the left-view image and the right-view image (S810).

The formatter 270 transmits the second control value calculated by the controller 240 (S820). The formatter 270 may transmit a sync signal for synchronizing the operation of the shutter glasses when the left-view image and the right-view image are displayed, along with the depth value.

In another embodiment, instead of the controller 240, the formatter 270 may calculate the second control value.

The glasses 120 control the focal length of the glasses based on the second control value (S830). If the transmitted second control value is a focal length value, the glasses 120 calculate a voltage value based on the transmitted second control value and apply the voltage to the lens unit according to the calculated voltage value. If the transmitted second control value is a voltage value, the glasses 120 may apply the voltage to the lens unit 330 according to the transmitted voltage value.

The display 130 displays the output left-view image and right-view image (S840). The display 130 may display the left-view image and the right-view image using the shutter glasses method or the polarization method. In addition, the display 130 may display the view image according to the 2-view display technology shown in FIG. 21 or the multi-view display technology shown in FIG. 22.

Light beams are refracted as they pass through the glasses 120 according to the controlled focal length (S850). The light beam emitted for displaying the left-view image and the right-view image in step S840 enters the lens unit 330 of the glasses 120 and the incident light beam is refracted according to the focal length of the lens unit 330.

Figure 26:
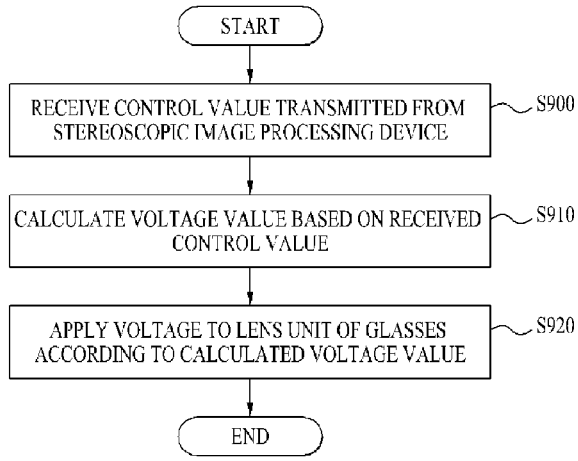
FIG. 26 is a diagram showing a method of driving glasses according to another exemplary embodiment of the present invention.

FIG. 26 is a diagram showing a method of driving glasses according to another exemplary embodiment of the present invention.

Referring to FIG. 26, the receiver 310 receives a second control value transmitted from the stereoscopic image processing device 110 (S900). The receiver 310 may receive the second control value transmitted in step S820.

The controller 320 calculates a voltage value based on the second control value received by the receiver 310 (S910).

The controller 320 applies the voltage to the lens unit 330 according to the calculated voltage value (S920).

Step S830 may include steps S910 and S920.

Figure 27:
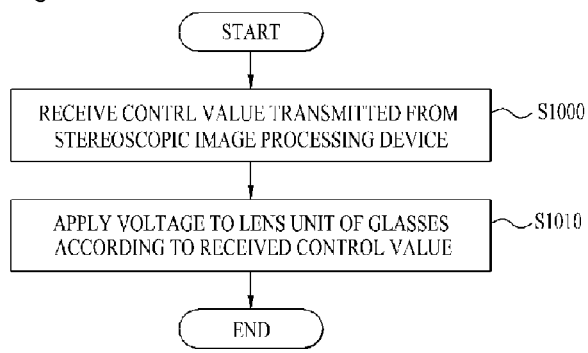
FIG. 27 is a diagram showing a method of driving glasses according to another exemplary embodiment of the present invention.

FIG. 27 is a diagram showing a method of driving glasses according to another exemplary embodiment of the present invention.

Referring to FIG. 27, the receiver 310 receives a second control value transmitted from the stereoscopic image processing device (S1000). The receiver 310 may receive the second control value transmitted in step S820.

The controller 320 applies the voltage to the lens unit 330 according to the second control value received by the receiver 310 (S1010).

Step S830 may include step S1010.

In another embodiment, the stereoscopic image processing method shown in FIG. 11 may include the steps of the stereoscopic image processing method shown in FIG. 23. In addition, the stereoscopic image processing method shown in FIG. 13 may include the steps of the stereoscopic image processing method shown in FIG. 25.

The present invention can also be embodied as computer-readable codes on a computer-readable recording medium. The computer-readable recording medium includes all data storage devices that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network coupled computer systems so that the computer readable code is stored and executed in a distributed fashion.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to a stereoscopic image processing system, a stereoscopic image processing method and glasses. Hence, the present invention has application to Display Industry.

The invention claimed is:

1. A stereoscopic image processing method comprising:
transmitting a first control value for controlling a prism diopter of glasses and a second control value for controlling a focal length of glasses, at once;
controlling the prism diopter of the glasses based on the transmitted first control value and the focal length of the glasses based on the transmitted second control value; and causing a prismatic effect on light passing through the glasses, wherein the controlling the prism diopter of the glasses comprises:

calculating the prism diopter using a depth value and a distance between both eyes; and setting the prism diopter of the glasses to the calculated prism diopter, wherein the prism diopter is calculated using the following equation: prism diopter=D1/D2−D1/D3, where D1 is a distance between both eyes, D2 is a distance from an eye to a stereoscopic image, and D3 is a distance from an eye to a display, and wherein the controlling the focal length of the glasses comprises:

calculating a focal length value using the depth value and a viewing distance; and setting the focal length of the glasses to the calculated focal length value, the focal length value being calculated using the following equation: 1/f3=1/f1−1/f2, where f1 is the viewing distance, f2 is a distance from an eye to a stereoscopic image, and f3 is the focal length value.

2. The stereoscopic image processing method according to claim 1, wherein the setting of the prism diopter of the glasses comprises:

calculating a value of a voltage to be applied to liquid crystal cells of the glasses based on the calculated prism diopter; and applying the voltage to the liquid crystal cells of the glasses according to the calculated voltage value.

3. Glasses comprising:

a receiver configured to receive a first control value for controlling a prism diopter of the glasses and a second control value for controlling a focal length of the glasses, at once;

a controller configured to control the prism diopter of the glasses based on the received first control value and the focal length of the glasses based on the received second control value; and a lens configured to cause a prismatic effect on light irradiated for displaying a left-view image and a right-view image and incident to the glasses according to the controlled prism diopter and the focal length, wherein the controller calculates the prism diopter using a depth value and a distance between both eyes and sets the prism diopter of the glasses to the calculated prism diopter, wherein the prism diopter is calculated using the following equation: prism diopter=D1/D2−D1/D3, where D1 is a distance between both eyes, D2 is a distance from an eye to a stereoscopic image, and D3 is a distance from an eye to a display, and wherein the controlling of the focal length of the glasses comprises:

calculating a focal length value using the depth value and a viewing distance; and setting the focal length of the glasses to the calculated focal length value, the focal length value being calculated using the following equation: 1/f3=1/f1−1/f2, where f1 is the viewing distance, f2 is a distance from an eye to a stereoscopic image, and f3 is the focal length value.

4. The glasses according to claim 3, wherein the controller calculates a value of a voltage to be applied to liquid crystal cells of the lens based on the calculated prism diopter and applies the voltage to the liquid crystal cells according to the calculated voltage value.

5. A stereoscopic image processing system comprising:

a formatter configured to transmit a first control value for controlling a prism diopter of glasses and a second control value for controlling a focal length of glasses, at once;

the glasses configured to control the prism diopter based on the transmitted first control value and the focal length of the glasses based on the transmitted second control value, and further configured to cause a prismatic effect on light passing through the glasses; and a controller configured to calculate the prism diopter and a focal length value using a depth value of a stereoscopic image displayed by a left-view image and a right-view image, wherein the prism diopter is calculated using the following equation: prism diopter=D1/D2−D1/D3, where D1 is a distance between both eyes, D2 is a distance from an eye to a stereoscopic image, and D3 is a distance from an eye to a display, and wherein the focal length value is calculated using the following equation: 1/f3=1/f1−1/f2, where f1 is the viewing distance, f2 is a distance from an eye to a stereoscopic image, and f3 is the focal length value.

6. The stereoscopic image processing system according to claim 5, wherein the controller further calculates a value of a voltage to be applied to liquid crystal cells of the glasses based on the calculated prism diopter.

* * * * *